United States Patent [19]

Vengsarkar

[11] Patent Number: 5,430,817
[45] Date of Patent: Jul. 4, 1995

[54] OPTICAL SYSTEMS AND DEVICES USING LONG PERIOD SPECTRAL SHAPING DEVICES

[75] Inventor: Ashish M. Vengsarkar, Chatham, N.J.

[73] Assignee: AT&T Corp., Murray Hill, N.J.

[21] Appl. No.: 220,866

[22] Filed: Mar. 31, 1994

[51] Int. Cl.⁶ .................................................. G02B 6/34
[52] U.S. Cl. ........................................ 385/37; 385/28; 385/123
[58] Field of Search ...................... 385/4, 5, 10, 12, 13, 385/27, 28, 37, 123

[56] References Cited

U.S. PATENT DOCUMENTS

| | | | |
|---|---|---|---|
| 4,912,523 | 3/1990 | Refi et al. | 385/37 X |
| 4,915,468 | 4/1990 | Kim et al. | 385/28 |
| 5,007,705 | 4/1991 | Morey et al. | 385/12 |
| 5,048,909 | 9/1991 | Henry et al. | 385/27 |
| 5,067,789 | 11/1991 | Hall et al. | 385/27 |
| 5,131,069 | 7/1992 | Hall et al. | 385/123 X |
| 5,216,739 | 6/1993 | Hill et al. | 385/123 |

*Primary Examiner*—John D. Lee
*Attorney, Agent, or Firm*—Glen E. Books

[57] ABSTRACT

In accordance with the present invention, optical fiber communications systems are provided with one or more long period spectral shaping devices to shift light of unwanted wavelength from guided modes into non-guided modes. Such devices can be used for removing unused laser pump energy, for removing amplified spontaneous emission, and for flattening the spectral response of an erbium amplifier. Such devices can also provide optical fiber sensing systems with inexpensive shift detectors.

6 Claims, 4 Drawing Sheets

OPTICAL SYSTEMS AND DEVICES USING LONG PERIOD SPECTRAL SHAPING DEVICES

FIELD OF THE INVENTION

This invention relates to optical systems and devices and, in particular, to optical systems and devices employing long period spectral shaping devices.

BACKGROUND OF THE INVENTION

Optical fibers are key components in modern telecommunications. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction.

A typical optical fiber communications system comprises a source of optical input signals, a length of optical fiber coupled to the source and a receiver for optical signals coupled to the fiber. One or more amplifying devices are disposed along the fiber for amplifying the transmitted signal. Pump energy must be supplied to operate the amplifier. Contemplated optical fiber systems use digitally modulated optical signals at a wavelength of 1.55 micrometers and erbium-doped fiber amplifiers.

Such systems present a number of difficulties. One problem is the disposition of unused pump energy in a counter-pumped fiber amplifier (with two pump sources). If unused pump energy from one source is permitted to propagate down the fiber towards the other pump source, it can deteriorate the performance of the amplifier. Also, in any amplifier, amplified spontaneous emission generated by the interaction of the pump power with the rare-earth ions can act as noise and adversely affect system performance. In both these cases, it would be useful to have an in-fiber device that can effectively introduce a wavelength-dependent loss to increase the efficiency of the amplifier.

Another problem limiting the capacity of such systems is that the erbium-doped fiber amplifier has a characteristic spectral dependence providing different gain for different wavelengths. This spectral dependence poses a problem for contemplated multichannel wavelength division multiplexed (WDM) systems because different gains for different channels would lead to high bit error rates in some of the channels. In this case, a spectral shaping device would help flatten the gain spectrum of the amplifier.

SUMMARY OF THE INVENTION

In accordance with the present invention, optical fiber communications systems are provided with one or more long period spectral shaping devices to shift light of unwanted wavelength from guided modes into non-guided modes. Such devices can be used for removing unused laser pump energy, for removing amplified spontaneous emission, and for flattening the spectral response of an erbium amplifier. Such devices can also provide optical fiber sensing systems with inexpensive shift detectors.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
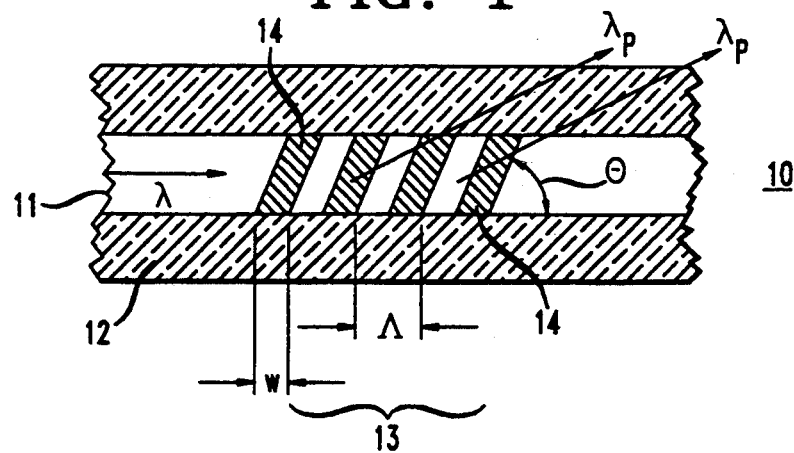
FIG. 1 is a schematic cross section of a long period spectral shaping device.

Referring to the drawings, FIG. 1 is a schematic cross section of a first embodiment of a long period spectral shaping device in accordance with the invention comprising a length of optical fiber 10 for transmitting light in a guided mode having a core 11 surrounded by a lower index cladding 12. The core 11 includes one or more long period gratings 13 each comprising a plurality of index perturbations 14 of width w spaced apart by a periodic distance $\Lambda$ where, typically, $50 \mu m \leq \Lambda \leq 1500 \mu m$. Advantageously $1/5\Lambda \leq w \leq 4/5\Lambda$ and preferably $w = \frac{1}{2}\Lambda$. The perturbations are formed within the glass core of the fiber and preferably form an angle of 74 ($2° \leq \theta \leq 90°$) with the longitudinal axis of the fiber. The fiber is designed to transmit broad band light of wavelength centered about $\lambda$.

Figure 2:
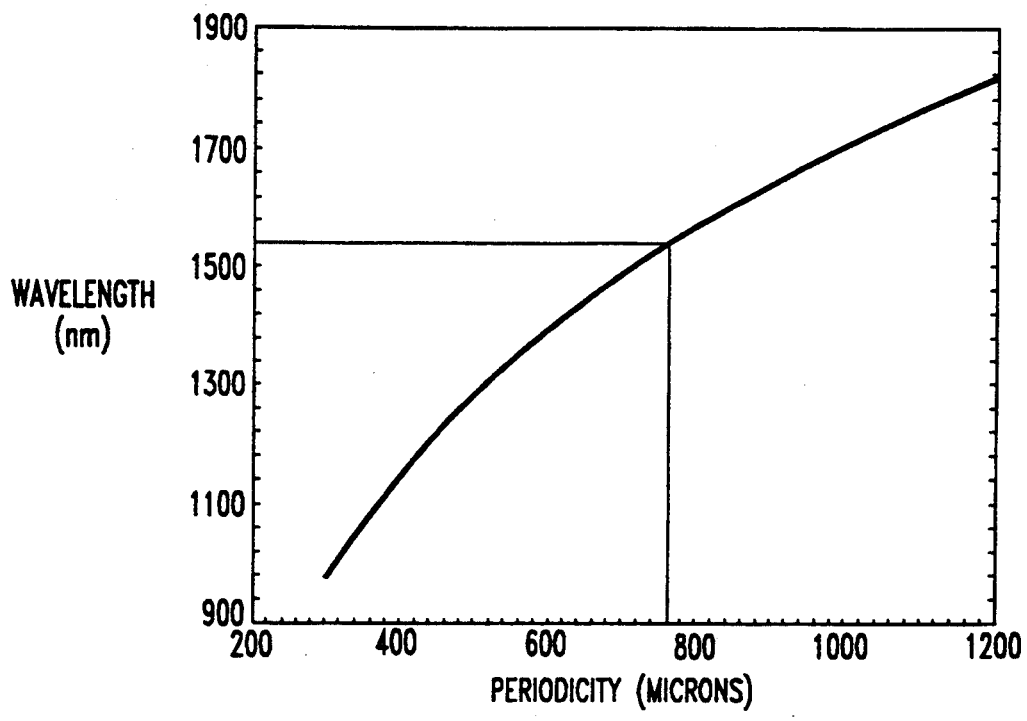
FIG. 2 is a graphical plot of center wavelength versus period useful in making the device of FIG. 1.
Figure 3:
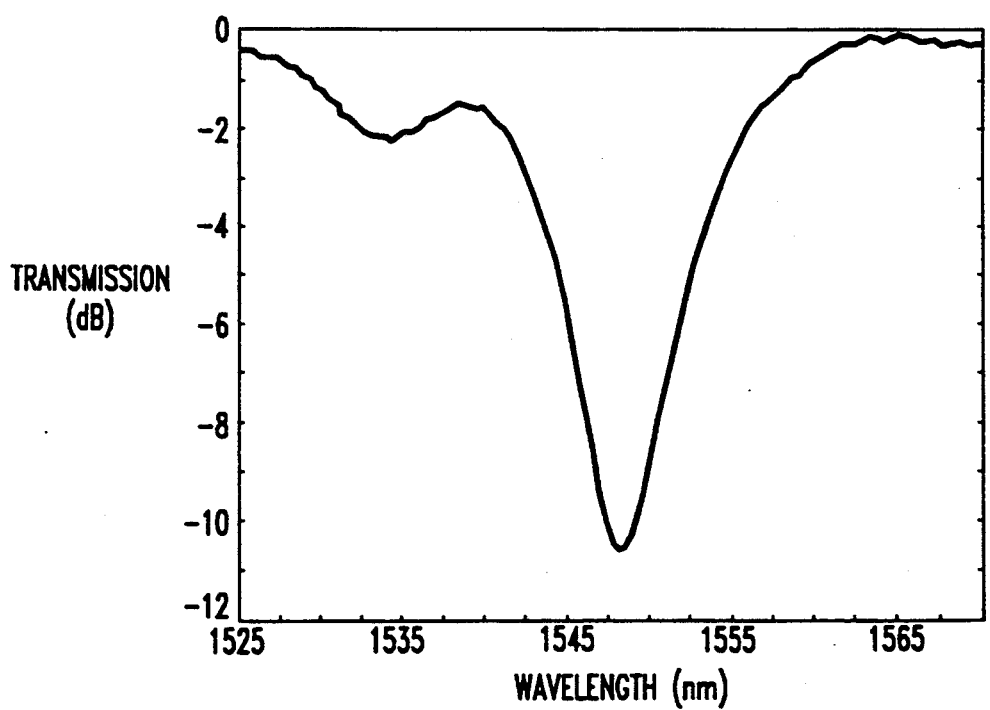
FIG. 3 is a typical transmission spectrum of a long-period shaping device used for removal of light in a wavelength region around $\lambda p$.

The spacing $\Lambda$ of the perturbations is chosen to shift transmitted light in the region of a selected wavelength $\lambda p$ from the guided mode into a non-guided mode, thereby reducing in intensity a band of light centered about $\lambda p$. In contrast with conventional short period gratings which reflect light, these long period devices remove the light without reflection by convening it from a guided mode to a non-guided mode. FIG. 2 is a graph illustrating the periodic spacing $\Lambda$ for removing light centered about a wavelength $\lambda p$. Thus, to make a device for removing light centered around 1540 nm, one chooses a spacing of about 760 $\mu m$ as shown in FIG. 2. FIG. 3 shows the transmission spectrum of a grating with $\lambda p$ at approximately 1550 nm indicating removal of most of the light at λp to non-guided radiation modes.

Preferably the optical fiber is single mode optical fiber having a silica core doped with photosensitive material such as germanium. Further, the fiber may be loaded with molecular hydrogen to enhance its photosensitivity. The long period grating 13 can then be formed by selectively exposing the core to beams of intense light of width w at locations separated by the distance Λ.

Figure 4:
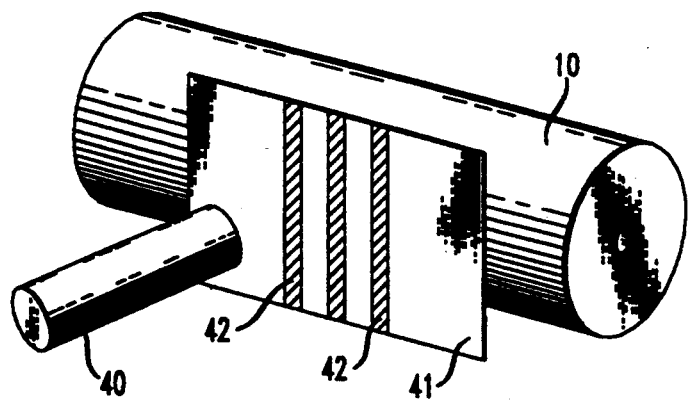
FIG. 4 illustrates apparatus useful in making the device of FIG. 1.

The preferred exposure source is UV radiation from a KrF excimer laser. Proper spacing can be effected by exposing through a slit of width w and then moving the fiber to the next exposure site. Alternatively, as shown in FIG. 4, the fiber 10 can be exposed to a wide beam from laser 40 through an amplitude mask 41 providing a plurality of transparent slits 42 at spacing Λ and opening widths w. Preferably the exposure dosage for each slit is on the order of 1000 pulses of >100 mJ/cm$^2$ fluence/pulse, and the number of perturbations is in the range 10–100 depending on the specific application.

Figure 5:
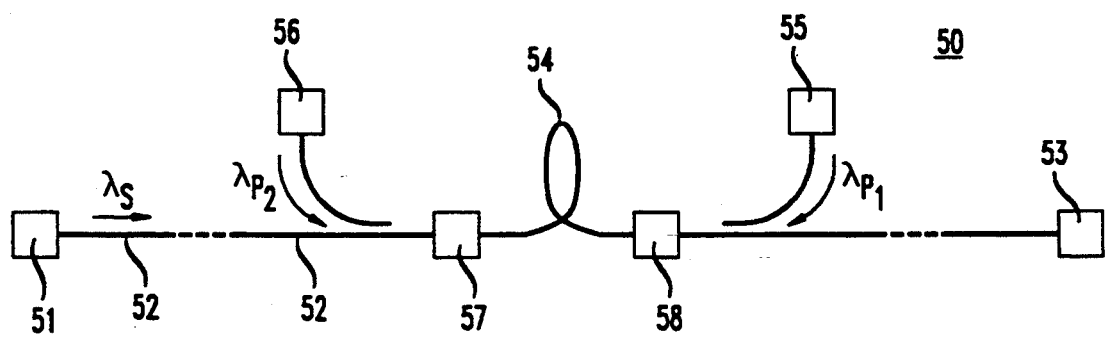
FIG. 5 shows an optical transmission system using long period spectral shaping devices to remove unused pump energy.

FIG. 5 illustrates an optical transmission system 50 using a long period spectral shaping device to remove unused pump energy. Specifically, the system 50 comprises a transmitter source 51 of optical signals such as a digitally modulated 1.55 μm signal, an optical signal path comprising a length of optical fiber 52 for transmitting the signal, and a receiver 53 for receiving and demodulating the signal. An optical amplifier such as an erbium-doped fiber amplifier 54 is disposed in the optical signal path for amplifying the transmitted signal. The amplifier is pumped by pump sources 55, 56 of optical energy of pump wavelengths $\lambda_{p1}$ and $\lambda_{p2}$. Unused pump energy of each pump wavelength will pass through amplifier 54. The energy is advantageously removed from the system so that it will not deteriorate the performance of the pump sources 55, 56 and transmission and receiving equipment 51, 53. To remove unused pump energy, a long period spectral shaping device 57 is disposed in the path of the energy from pump 55 after it has passed through amplifier 54. Specifically, in the dual-pumped laser of FIG. 5, device 57 has its spacing Λ chosen to remove energy of wavelength $\lambda_{p1}$. A second long period grating 58 has its spacing chosen to remove energy of wavelength $\lambda_{p2}$. In a typical application, $\lambda_s$ is 1.55 μm, $\lambda_{p1}$ is 9.780 μm and $\lambda_{p2}$ is 9.840 μm. Thus, for example, device 57 could comprise a hydrogen-loaded germanosilicate fiber with core index and diameter chosen such that it allows the propagation of only the fundamental mode at λ≧9.70 μm. For this application the perturbations should be exposed by a dosage ≧100 mJ/cm$^2$ and there should be at least 20 perturbations in each grating.

Figure 6:
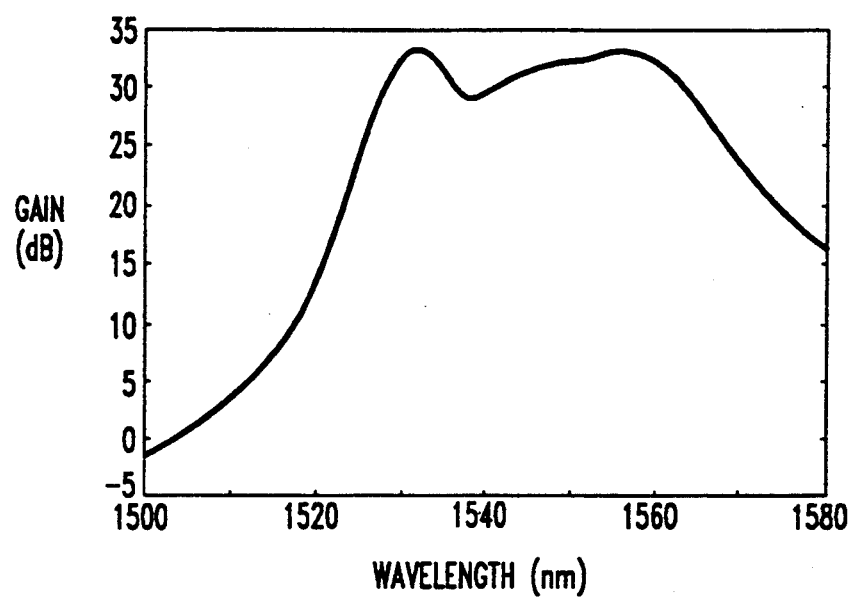
FIG. 6 shows the characteristic gain vs wavelength spectrum of a typical erbium-doped fiber amplifier.

Another preferred use of the device of FIG. 1 is to reduce spectral dependence in the gain output of an optical amplifier. The characteristic gain spectrum of an erbium-doped optical fiber amplifier is shown in FIG. 6. As can be seen, the amplifier has a pair of gain peaks at about 1.53 μm and at about 1.56 μm. So a signal at 1.53 μm will be amplified more than one at 1.54 μm, which would be disadvantageous in a WDM system.

Figure 8:
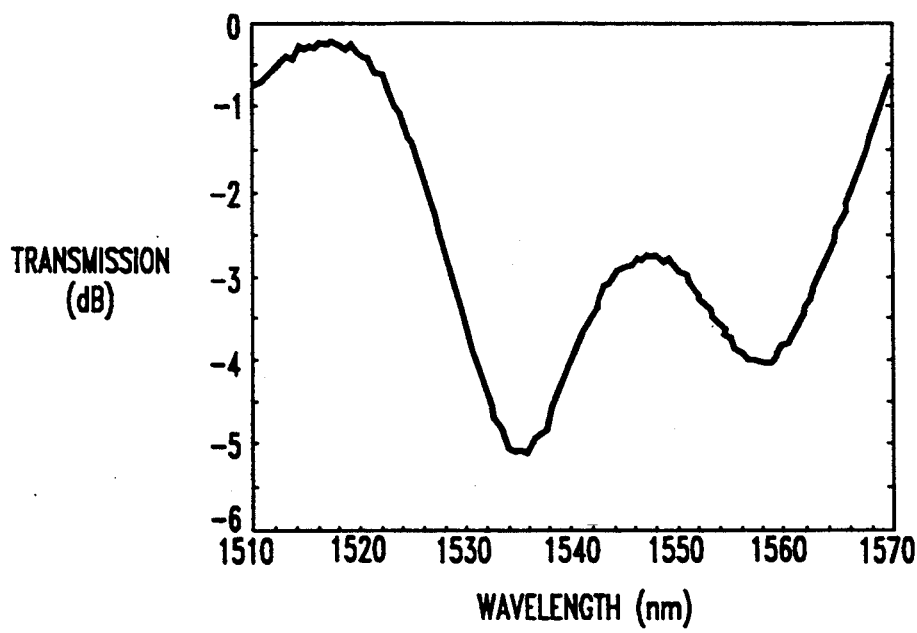
FIG. 8 is a typical transmission spectrum of long period shaping device useful for flattening the gain of an erbium amplifier.
Figure 7:
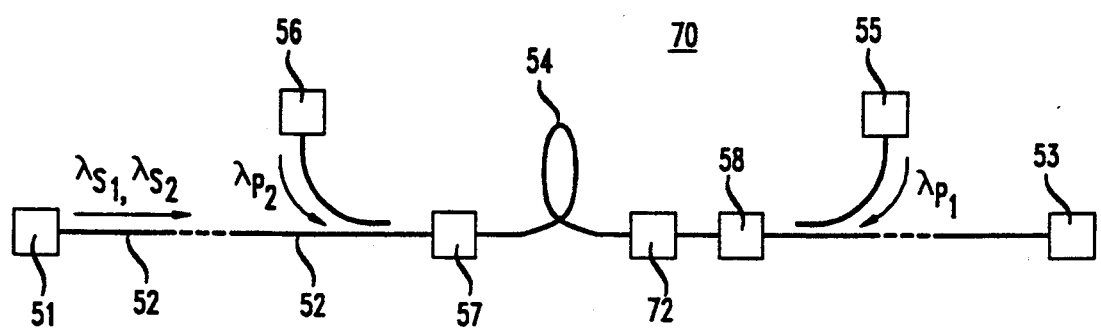
FIG. 7 shows an optical transmission system using a long period spectral shaping device to reduce the spectral dependence of an erbium amplifier.

FIG. 7 illustrates an optical transmission system 70 using a long period shaping device 72 to reduce the spectral dependence of an optical amplifier such as erbium-doped fiber amplifier 54. Specifically, the device 72 is serially disposed in the output path of the amplifier 54. The shaping device 72 has one set of spacings Λ chosen to remove energy of wavelength 1.53 μm corresponding to the gain peak wavelength of the amplifier and another set of spacings to remove energy of wavelength 1.56 μm at the other gain peak. By proper choice of the number of perturbations and the dosage of exposure, the gain spectrum of the amplifier device combination can be made substantially flat over a range of wavelengths 1530 to 1560 nm. For a typical erbium amplifier, the shaping device exposed by a dosage ≦100 mJ/cm$^2$, 1000 pulses per slit will produce a more uniform gain response over the range of wavelengths 1530–1560 nm. The transmission spectrum of such a device is shown in FIG. 8. Advantageously, system 70 can be a WDM system using a plurality of different wavelength signals, e.g. $\lambda_{s1}$ and $\lambda_{s2}$.

Another useful application of the FIG. 1 device pertains to optical fiber sensing systems. Conventional fiber sensing systems typically use an optical fiber including one or more narrow spacing reflective gratings. In the absence of strain, the reflective grating will reflect light of wavelength λ. But if the grating region is subject to strain, the spacing d will change by an amount Δd producing a reflected wavelength shift Δλ. This shift Δλ can be detected in a spectrum analyzer and the strain can be determined from Δλ. The problem, however, is that spectrum analyzers are expensive.

Figure 9:
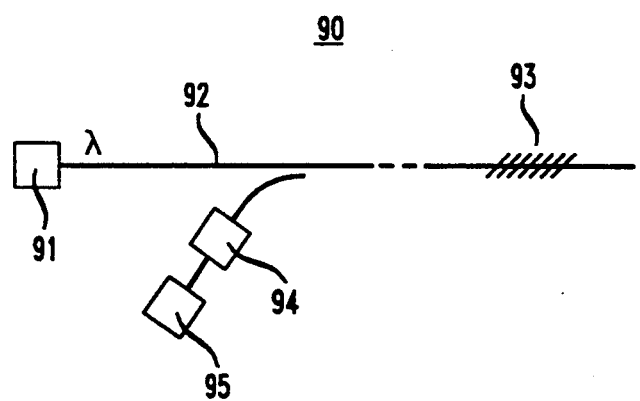
FIG. 9 shows an optical fiber sensing system using a long period shaping device to provide frequency shift detection.

FIG. 9 illustrates an optical fiber sensing system 90 using a long period grating to provide an inexpensive wavelength shift detector. In essence, the sensing device comprises a source 91 of optical energy around wavelength λ, a length of optical fiber 92 including a short period reflective sensing grating 93 for reflecting light of wavelength λ, a long period grating 94 coupled to fiber 92 for receiving light reflected from short period grating 93 and a photodetector 95 for detecting the intensity of light through device 94. More specifically, device 94 has spacing Λ chosen so that λ in the output intensity spectrum is in a region of substantially linear slope. In such a region, a shift Δλ in the reflected wavelength will produce a linear shift in the intensity output of device 94 which can be detected by photodetector 95. The system thus substitutes inexpensive components 94, 95 for the high cost spectrum analyzer of the prior art.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

I claim:

1. An optical fiber communications system comprising:

a source of an optical signal;

optically coupled to said source, an optical signal path comprising length of optical fiber for transmitting said optical signal;

disposed in said optical signal path, an optical amplifier for amplifying said optical signal;

a pair of pumping sources for pumping said optical amplifier with optical pumping energy of wavelengths $\lambda_{p1}$ and $\lambda_{p2}$;

disposed in the path of energy from each pump after said pumping energy has passed through said amplifier unused, a spectral shaping device for removing said unused pumping energy from said optical path by shifting said pumping energy to an unguided mode.

2. A communications system according to claim 1 wherein said spectral shaping device comprises a long period fiber grating comprising a fiber having a plurality of index perturbations of width w spaced apart by a periodic distance $\Lambda$ where 50 $\mu$m $\leq \Lambda \leq$ 1500 $\mu$m.

3. A communications system according to claim 1 wherein said optical amplifier comprises an erbium-doped optical fiber amplifier.

4. A communications system according to claim 1 wherein said optical amplifier comprises an erbium-doped optical fiber amplifier.

5. An optical fiber communications system comprising:

a source of at least one optical signal;

optically coupled to said source, an optical signal path comprising a length of optical fiber for transmitting said optical signal;

disposed in said optical signal path, an optical amplifier having a gain spectral dependence with one or more peak regions providing different gain for different wavelengths;

disposed in said optical path following said optical amplifier, a spectral shaping device for removing energy from the spectral region of one or more of said peak regions in order to provide a more uniform spectral output, said spectral shaping device comprising a long period fiber grating comprising a fiber having a plurality of index perturbations spaced apart by a periodic distance $\Lambda$ where 50 $\mu$m $\leq \Lambda \leq$ 1500 $\mu$m, said grating removing light without reflection by converting it from a guided mode to a non-guided mode.

6. A long period spectral shaping device comprising a fiber for guiding light energy in a guided mode having a plurality of index perturbations of width w spaced apart by a periodic distance $\Lambda$ where 50 $\mu$m $\leq \Lambda \leq$ 1500 $\mu$m, said device removing from said fiber light from said guided mode by shifting said light from said guided mode to a non-guided mode.

* * * * *